US005910637A

United States Patent [19]

Meiller et al.

[11] Patent Number: 5,910,637

[45] Date of Patent: Jun. 8, 1999

[54] FUEL VAPOR STORAGE CANISTER

[75] Inventors: Thomas Charles Meiller, Pittsford; Timothy Michael Beadnell, Avon; Charles Henry Covert, Manchester, all of N.Y.

[73] Assignee: General Motors Corporation, Detroit, Mich.

[21] Appl. No.: 08/917,308

[22] Filed: Aug. 25, 1997

[51] Int. Cl.[6] ..................... B01D 53/04

[52] U.S. Cl. ..................... 96/135; 96/139; 96/141; 96/144; 96/152; 123/519

[58] Field of Search ..................... 95/146; 96/134, 96/135, 139, 140, 141, 144, 147, 152; 55/385.3; 123/519

[56] References Cited

U.S. PATENT DOCUMENTS

| | | | |
|---|---|---|---|
| 4,658,796 | 4/1987 | Yoshida et al. | 55/385.3 |
| 4,714,485 | 12/1987 | Covert et al. | 96/143 |
| 4,750,465 | 6/1988 | Rediker, Jr. et al. | 96/144 |
| 4,853,009 | 8/1989 | Turner et al. | 96/144 |
| 4,894,072 | 1/1990 | Turner et al. | 55/385.3 |
| 5,119,791 | 6/1992 | Gifford et al. | 96/144 |
| 5,304,235 | 4/1994 | Watanabe et al. | 96/147 |
| 5,538,542 | 7/1996 | Watanabe et al. | 95/146 |
| 5,538,543 | 7/1996 | Watanabe et al. | 95/146 |
| 5,641,344 | 6/1997 | Takahashi et al. | 96/152 |
| 5,645,036 | 7/1997 | Matsumoto et al. | 123/519 |

FOREIGN PATENT DOCUMENTS

| | | | |
|---|---|---|---|
| 556488 | 8/1993 | European Pat. Off. | 123/519 |

*Primary Examiner*—Duane S. Smith
*Attorney, Agent, or Firm*—Saul Schwartz; Vincent A. Cichosz

[57] ABSTRACT

A fuel vapor storage canister including a mass of carbon granules in a carbon bed chamber of the canister, a liquid trap having a polygonal internal chamber between a vapor inlet port and the carbon bed chamber, and a purge duct traversing the polygonal chamber. The polygonal chamber includes a plurality of three sides which define the gravitational bottom of the chamber in respective ones of a plurality of three orientations of the vapor storage canister. A pick-up tube in the polygonal internal chamber has an outboard end at the convergence of the aforesaid plurality of three sides and an inboard end surrounding an orifice in the vapor purge duct. The inboard end of the pick-up tube is vertically above the maximum level of liquid fuel in the polygonal internal chamber in each of the aforesaid plurality of three orientations of the vapor storage canister. A pressure gradient between the vapor purge duct and the polygonal internal chamber induces liquid fuel to flow through the pick-up tube and the metering orifice into the vapor purge duct.

6 Claims, 3 Drawing Sheets

FUEL VAPOR STORAGE CANISTER

TECHNICAL FIELD

This invention relates to a fuel vapor storage canister in a motor vehicle evaporative emission control system.

BACKGROUND OF THE INVENTION

A fuel vapor storage canister in an evaporative emission control system for a motor vehicle typically includes a mass of carbon granules in a carbon bed chamber of the canister which adsorb fuel vapor conducted to the canister from a fuel tank of the motor vehicle through a vapor transfer conduit. Fuel vapor is extracted from the carbon bed chamber through a vapor purge duct. Commonly, a liquid trap on the vapor storage canister captures liquid fuel entrained with the fuel vapor in the vapor transfer conduit to prevent contamination of the carbon granules. Liquid traps on some vapor storage canisters are passively purged, i.e., captured liquid fuel either evaporates from the trap or drains by gravity back to the fuel tank. Liquid traps on vapor storage canisters described in U.S. Pat. Nos. 4,714,485 and 4,853,009, issued Dec. 22, 1987 and Aug. 1, 1989, respectively, and assigned to the assignee of this invention, are actively purged, i.e., captured liquid fuel is induced by a pressure gradient between the liquid trap and the purge duct to flow from the liquid trap into the purge duct through a metering orifice submerged in liquid fuel in the liquid trap. A fuel vapor storage canister according to this invention is a novel alternative to the fuel vapor storage canisters described in the aforesaid U.S. Pat. Nos. 4,714,485 and 4,853,009.

SUMMARY OF THE INVENTION

This invention is a new and improved fuel vapor storage canister for a motor vehicle evaporative emission control system including a mass of carbon granules in a carbon bed chamber of the canister, a liquid trap having a polygonal internal chamber between a vapor inlet port of the canister and the carbon bed chamber, and a tubular purge duct traversing the polygonal chamber from the carbon bed chamber to a vapor purge port of the vapor storage canister. The polygonal chamber includes a plurality of three sides which define the gravitational bottom of the chamber in respective ones of a plurality of three orientations of the vapor storage canister. A pick-up tube in the polygonal chamber has an outboard end at the convergence of the aforesaid plurality of three sides of the polygonal chamber and an inboard end surrounding a metering orifice in the internal vapor purge duct. The inboard end of the pick-up tube is vertically above the outboard end thereof in each of the aforesaid plurality of three orientations of the vapor storage canister. A pressure gradient between the vapor purge duct and the polygonal chamber induces liquid fuel to flow through the pick-up tube and the metering orifice into a gaseous stream in the vapor purge duct in any of the aforesaid plurality of three orientations of the vapor storage canister. A filter in the pick-up tube protects the metering orifice against contamination and wicks liquid fuel to enhance the flow of liquid fuel to the metering orifice.

DESCRIPTION OF THE PREFERRED EMBODIMENT

Figure 1:
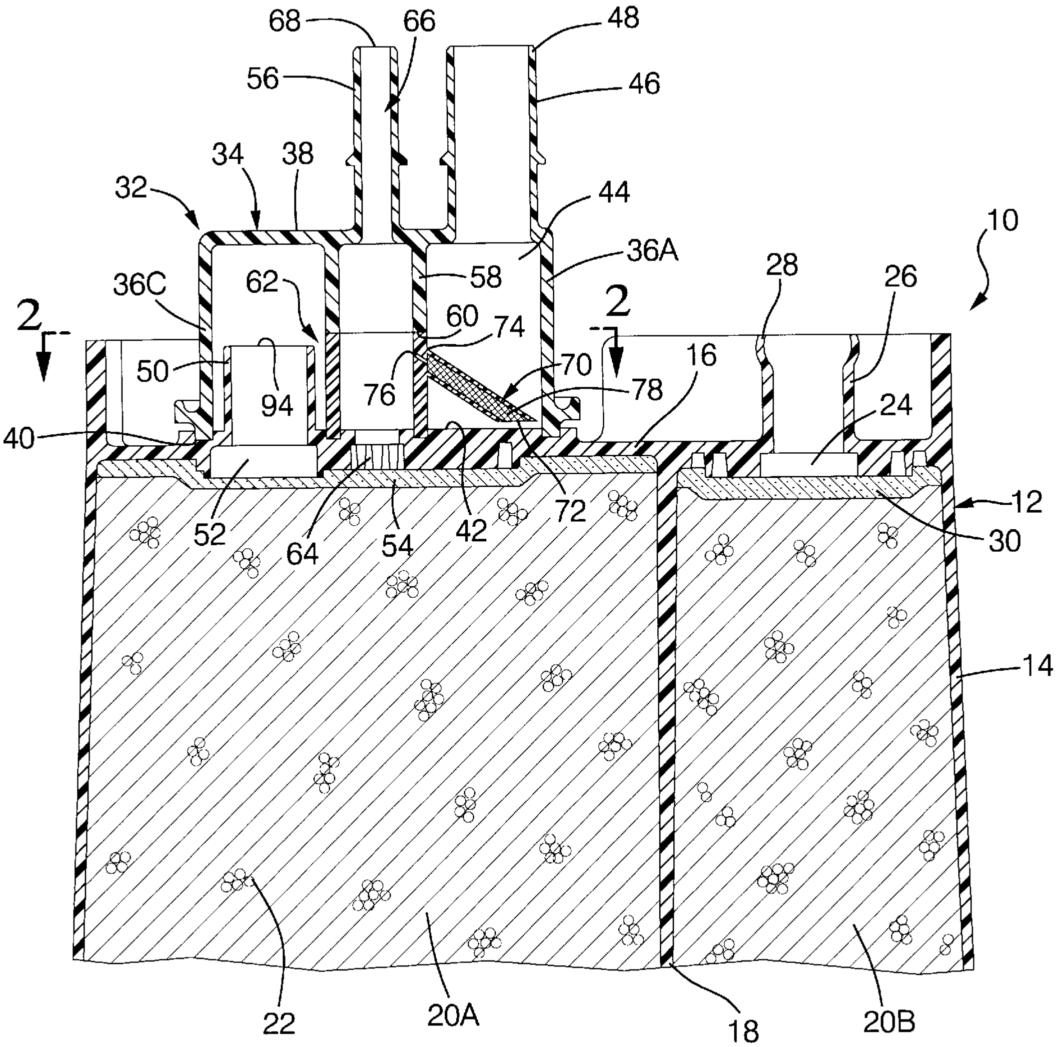
FIG. 1 is a fragmentary sectional view in elevation of a fuel vapor storage canister according to this invention.
Figure 2:
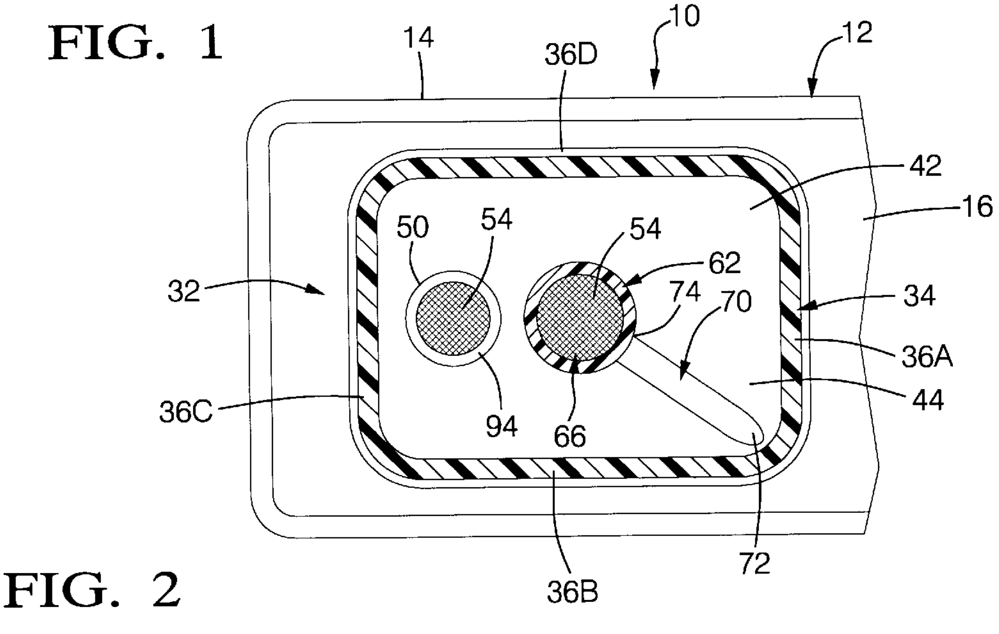
FIG. 2 is a sectional view taken generally along the plane indicated by lines 2—2 in FIG. 1.

Referring to FIGS. 1–2, a fuel vapor storage canister 10 according to this invention includes a generally rectangular, cup-shaped canister body 12 having a side wall 14, an end wall 16, and an internal partition 18 dividing the canister body into a pair of carbon bed chambers 20A, 20B. A cover, not shown, on the canister body opposite the end wall 16 thereof captures a mass of carbon granules 22 in the carbon bed chambers 20A, 20B. The carbon bed chambers 20A, 20B are in flow communication with each other around the internal partition 18.

A first plenum 24 of the vapor storage canister 10 is molded into the end wall 16 of the canister body 12 at an end of the carbon bed chamber 20B. A tubular plastic connector 26 integral with the end wall 16 on the side thereof opposite the carbon bed chamber 20B communicates with the first plenum 24 and defines a vent port 28 of the vapor storage canister 10 through which the carbon bed chamber 20B communicates with the atmosphere surrounding the vapor storage canister. A plastic foam screen 30 separates the first plenum from the carbon bed chamber 20B.

A liquid trap 32 of the fuel vapor storage canister 10 includes a molded plastic housing 34 having a plurality of four sides 36A, 36B, 36C, 36D and an integral end 38. A continuous edge 40 of the housing 34 opposite the end 38 is sonically welded or otherwise rigidly and sealingly attached to the end wall 16 of the canister body 12 on the side of the latter opposite the carbon bed chamber 20A. The sides 36A, 36B, 36C, 36D, the end 38, and an end wall segment 42 of the end wall 16 of the canister body within the continuous edge 40 cooperate in defining a polygonal internal chamber 44 of the liquid trap 32.

A tubular boss 46 on the end 38 of the housing 34 of the liquid trap is in fluid communication with the polygonal internal chamber 44 and defines a vapor inlet port 48 of the fuel vapor storage canister 10. A tubular boss 50 on the end wall 16 of the canister body 12 on the side thereof opposite the carbon bed chamber 20A communicates with the polygonal internal chamber 44 and with the carbon bed chamber 20A through a second plenum 52 in the end wall 16. A plastic foam screen 54 is interposed between the carbon bed chamber 20A and the second plenum 52.

As seen best in FIG. 1, a tubular boss 56 on the end 38 of the housing 34 of the liquid trap outside of the polygonal chamber 44 communicates with another tubular boss 58 on the end 38 inside of the polygonal chamber 44. The tubular boss 58 terminates at an edge 60, FIG. 1, separated from the end wall segment 42. A plastic tubular strut 62 is disposed between the edge 60 of the boss 58 and the end wall segment 42 and is sealingly attached to each. The tubular strut 62 communicates with the carbon bed chamber 20A in the canister body through a third plenum 64 molded in the end wall 16. The third plenum is separated from the carbon bed chamber 20A by the plastic foam screen 54. The strut 62 cooperates with the bosses 56, 58 in defining a purge duct 66 of the vapor storage canister 10 which traverses the polygonal chamber 44 and which terminates outside of the polygonal chamber at a purge port 68 of the vapor storage canister.

A pick-up tube 70 integral with the tubular strut 62 has an outboard end 72 generally at the corner of the polygonal chamber 44 defined by convergence of the sides 36A, 36B of the housing 34 and the end wall segment 42. The pick-up tube has an inboard end 74 at the tubular strut 62 surrounding a metering orifice 76 in the latter exposed to the vapor purge duct 66. A filter 78 suitable for blocking particles larger than the metering orifice 76 and for wicking liquid fuel is disposed in the pick-up tube 70.

Figure 3A:
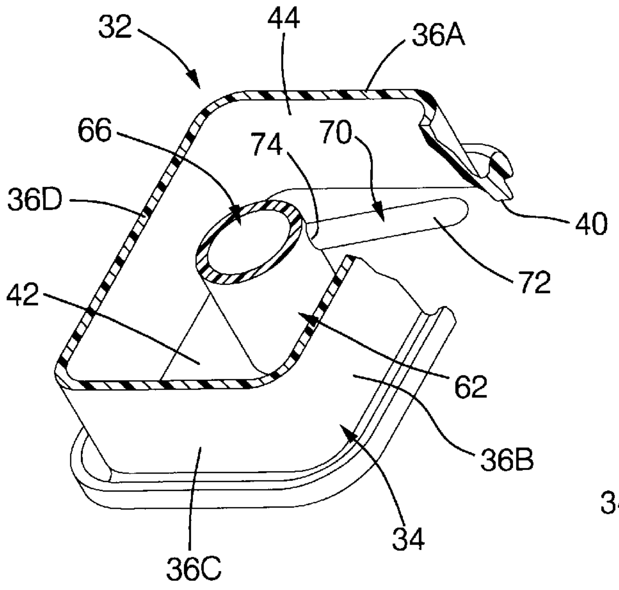
FIGS. 3A–3C are fragmentary, broken-away, perspective schematic views of a liquid trap of the fuel vapor storage canister according to this invention in a plurality of three mutually perpendicular positions of the latter.
Figure 3B:
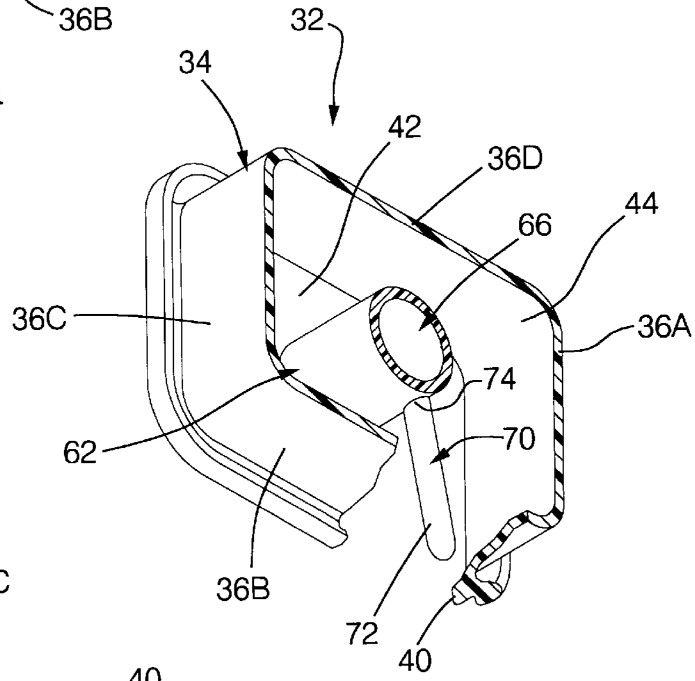
Figure 3C:
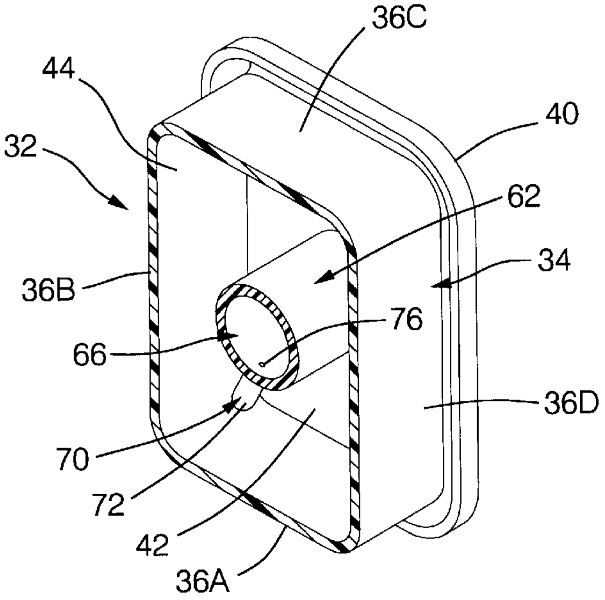

The vapor storage canister 10 may be mounted on a motor vehicle in any one of a plurality of three orientations, i.e., vertical, horizontally flat, and horizontally upright. When the vapor storage canister 10 is vertical, FIGS. 1 and 3A, the end wall segment 42 defines the gravitational bottom of the polygonal chamber 44. When the vapor storage canister 10 is horizontally flat, FIG. 3B, the side 36B of the housing 34 defines the gravitational bottom of the polygonal chamber 44. When the vapor storage canister 10 is horizontally upright, FIG. 3C, the side 36A of the housing 34 defines the gravitational bottom of the polygonal chamber 44. Importantly, by virtue of its proximity to the convergence of the sides 36A, 36B and the end wall segment 42, the outboard end 72 of the pick-up tube 70 is juxtaposed the one of the sides 36A, 36B and the end wall segment 42 defining the gravitational bottom of the polygonal chamber in each of the aforesaid plurality of three orientations of the vapor storage canister 10.

Figure 4:
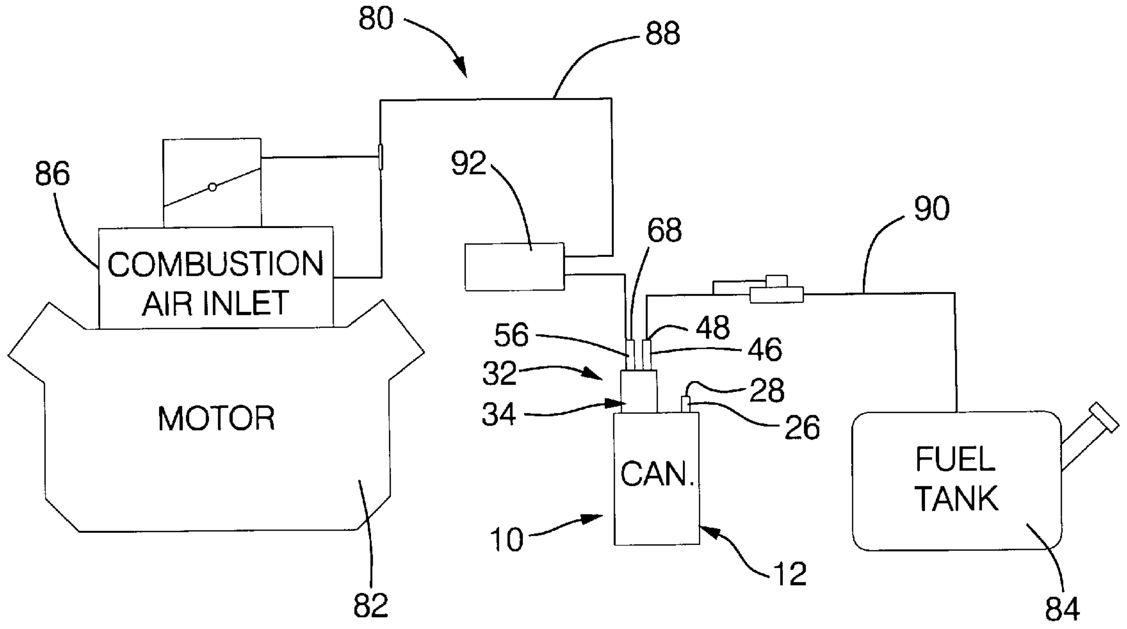
FIG. 4 is a fragmentary, schematic representation of a motor vehicle evaporative emission control system including the fuel vapor storage canister according to this invention.

Referring to FIG. 4, the vapor storage canister 10 is incorporated in a schematically and fragmentarily illustrated evaporative emission control system 80 of the aforesaid motor vehicle between a motor 82 of the vehicle and a fuel tank 84 of the vehicle. A combustion air inlet 86 of the motor 82 is connected to the purge port 68 of the storage canister 10 through a vapor purge conduit 88. The fuel tank 84 of the motor vehicle is connected to the vapor inlet port 48 of the storage canister 10 through a vapor transfer conduit 90. A solenoid valve 92 in the purge conduit 88 opens and closes the purge conduit when the motor 82 is on and off, respectively.

Vapor pressure in the fuel tank 84 induces a flow of a mixture of fuel vapor and air to the carbon bed chambers 20A, 20B through the vapor transfer conduit 90, the vapor inlet port 48, and the polygonal chamber 44. The tubular boss 50 on the end wall 16 in the polygonal chamber 44 forces fuel vapor entering through the vapor inlet port to traverse a tortuous or serpentine flow path through the polygonal chamber which effectively separates from the gaseous constituents any liquid fuel transported from the fuel tank through the vapor transfer conduit 90.

Liquid fuel separated from gaseous constituents in the liquid trap 32 collects above the one of the sides 36A, 36B and the end wall segment 42 defining the gravitational bottom of the polygonal chamber 44 in the aforesaid three orientations of the vapor storage canister 10. In the aforesaid vertical orientation of the vapor storage canister, FIGS. 1 and 3A, the tubular boss 50 defines a stand pipe which traps liquid fuel in the polygonal chamber to the elevation of a lip 94 on the tubular boss. In each of the aforesaid horizontal flat and horizontal upright orientations of the vapor storage canister, FIGS. 3B and 3C, the tubular boss 50 is parallel to and above the one of the sides 36A, 36B defining the gravitational bottom of the polygonal chamber 44 so that liquid fuel is trapped to the elevation tangent to the lip 94 of the tubular boss 50. The elevation of the lip 94 in each of the three orientations of the vapor storage canister is calculated to capture a maximum anticipated quantity of entrained liquid fuel in the polygonal internal chamber.

Inside the canister body, the fuel vapor and air mixture circulates through the mass of carbon granules 22 in the carbon bed chambers 20A, 20B toward the vent port 28 during which circulation the carbon granules strip the vapor from the mixture so that only uncontaminated air escapes through the vent port. The solenoid valve 92 closes the purge conduit 88 when the motor 82 is off.

When the motor is on, the combustion air inlet 86 of the motor is at subatmospheric pressure and the solenoid valve 92 opens the purge conduit 88. The pressure gradient between the combustion air inlet 86 and the vent port 28 of the storage canister 10 induces a flow of fresh air through the carbon bed chambers 20A, 20B from the vent port toward the purge port 68. The fresh air strips fuel vapor from the mass of carbon granules in the canister body to produce a gaseous mixture of air and fuel vapor which flows to the combustion air inlet 86 through the purge duct 66, the vapor purge port 68, and the vapor purge conduit 88.

At the same time, a pressure gradient exists between the purge duct 66 and the polygonal chamber 44 of the liquid trap 32 across the metering orifice 76. Such pressure gradient induces liquid fuel captured in the liquid trap to flow through the pick-up tube 70 from the outboard end 72 thereof to the metering orifice 76 and then into the purge duct 66. Liquid fuel thus extracted from the polygonal chamber 44 disperses at a predetermined, controlled rate into the gaseous stream of air and fuel vapor flowing to the combustion air inlet 86. The proximity of the outboard end 72 of the pick-up tube to the convergence of the sides 36A, 36B and the end wall segment 42 assures substantially complete extraction of liquid fuel from the polygonal chamber 44 in each of the aforesaid plurality of three orientations of the vapor storage canister 10. Importantly, because the metering orifice 76 is always substantially vertically above the gravitational bottom of the polygonal chamber 44, liquid fuel cannot collect by gravity in the purge duct 66 and, therefore, cannot be ingested en masse by the combustion air inlet 86 of the motor 82.

Figure 5:
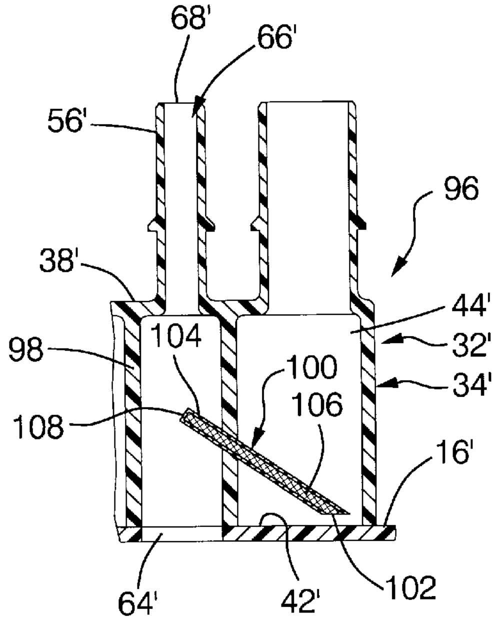
FIG. 5 is a fragmentary sectional view in elevation of a modified embodiment of the fuel vapor storage canister according to this invention.

Referring to FIG. 5, a fragmentarily illustrated modified vapor storage canister 96 according to this invention is identical to the vapor storage canister 10 described above except as now recited. Structural elements common to both the vapor storage canister 10 and the modified vapor storage canister 96 are identified by primed reference characters. A liquid trap 32' on the modified vapor storage canister 96 includes a housing 34' on an end wall 16' of a canister body of the vapor storage canister. A tubular boss 56' on an end 38' of the housing 34' outside of a polygonal internal chamber 44' in the latter defines a vapor purge port 68' of the modified fuel vapor storage canister. A plastic tubular strut 98 traverses the polygonal chamber 44' between the end 38' of the housing 34' and an end wall segment 42' of the canister body and cooperates with the tubular boss 56' in defining a vapor purge duct 66' between the purge port 68' and a plenum 64' exposed to a carbon bed chamber, not shown, of the vapor storage canister.

A pick-up tube 100 traverses the wall of the tubular strut 98 and is rigidly attached to the latter. The pick-up tube has an outboard end 102 generally at the convergence of two sides of the housing 34' and the end wall segment 42' so that the outboard end is near the gravitational bottom of the polygonal chamber 44' in each of the aforesaid plurality of three orientations of the vapor storage canister. The pick-up tube 100 has an inboard end 104 generally in the middle of the flow area of the vapor purge duct 66'. A filter 106 is disposed in the pick-up tube between the outboard end 102 of the latter and a metering orifice 108 at the inboard end 104 of the pick-up tube. When the motor of the motor vehicle is on, the pressure gradient between the vapor purge duct 66' and the polygonal chamber 44' induces liquid fuel to flow through the pick-up tube and the metering orifice for dispersal generally in the middle of the gaseous stream flowing in the vapor purge duct 66' toward the vapor purge port 68'.

Figure 6:
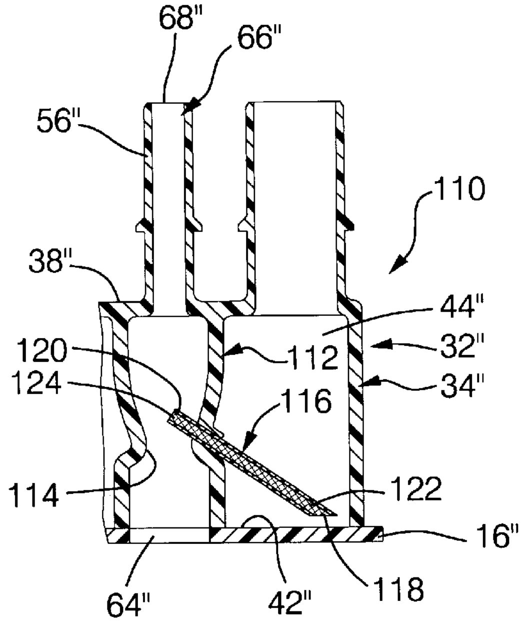
FIG. 6 is a fragmentary sectional view in elevation of a second modified embodiment of the fuel vapor storage canister according to this invention.

Referring to FIG. 6, a fragmentarily illustrated second modified vapor storage canister 110 according to this invention is identical to the vapor storage canister 10 described above except as now recited. Structural elements common to both the vapor storage canister 10 and the second modified vapor storage canister 110 are identified by double primed reference characters. A liquid trap 32" on the modified vapor storage canister 110 includes a housing 34" on an end wall 16" of a canister body of the vapor storage canister. A tubular boss 56" on an end 38" of the housing 34" outside of a polygonal internal chamber 44" of the latter defines a vapor purge port 68" of the fuel vapor storage canister. A plastic tubular strut 112 traverses the polygonal chamber 44" between the end 38" and an end wall segment 42" and cooperates with the tubular boss 56" in defining a vapor purge duct 66" between the purge port 68" and a plenum 64" on the end wall 16" exposed to a carbon bed chamber, not shown, of the vapor storage canister. The tubular strut 112 has a throat 114 therein the flow area of which is less than the flow area of the strut on opposite sides of the throat.

A pick-up tube 116 traverses the wall of the tubular strut 112 and is rigidly attached to the latter. The pick-up tube has an outboard end 118 generally at the convergence of two sides of the housing 34" and the end wall segment 42" so that the outboard end is near the gravitational bottom of the polygonal chamber 44" in each of the aforesaid plurality of three orientations of the vapor storage canister. The pick-up tube 116 has an inboard end 120 generally in the middle of the flow area of the vapor purge duct 66" near the throat 114. A filter 122 is disposed in the pick-up tube between the outboard end of the latter and a metering orifice 124 at the inboard end of the pick-up tube. When the motor of the motor vehicle is on, the pressure gradient between the vapor purge duct 66" and the polygonal chamber 44" induces liquid fuel to flow through the pick-up tube and the metering orifice into generally the center of the gaseous stream flowing in the vapor purge duct 66" toward the vapor purge port 68". The throat 114 of the strut 112 increases the flow velocity in the vicinity of the inboard end 120 of the pick-up tube to enhance the pressure gradient between the vapor purge duct 66" and the polygonal chamber 44".

Having thus described the invention, what is claimed is:

1. A fuel vapor storage canister comprising:

a canister body having a carbon bed chamber therein, a liquid trap housing on said canister body having a polygonal internal chamber therein including a plurality of three sides which define said gravitational bottom of said polygonal internal chamber in respective ones of a plurality of three orientations of said fuel vapor storage canister and which converge at a corner of said polygonal internal chamber, a vapor inlet port communicating with said polygonal internal chamber, a tubular boss on said canister body in said polygonal internal chamber communicating with said carbon bed chamber having a lip vertically above a gravitational bottom of said polygonal internal chamber, said tubular boss defining a serpentine flow path through said polygonal internal chamber from said vapor inlet port to said carbon bed chamber operative to separate and capture in said polygonal internal chamber up to the level of said lip on said tubular boss liquid fuel entrained with fuel vapor entering said polygonal internal chamber through said vapor inlet port, a vapor purge duct traversing said polygonal internal chamber from said carbon bed chamber to a vapor purge port, a metering orifice in said vapor purge duct vertically above said lip on said tubular boss relative to said gravitational bottom of said polygonal internal chamber, and a pick-up tube having an inboard end around said metering orifice and an outboard end disposed substantially at said corner of said polygonal internal chamber defined at the convergence of said plurality or three sides so that when said purge duct is connected to a source of subatmospheric pressure a pressure gradient between said vapor purge duct and said polygonal internal chamber induces a flow of liquid fuel into said purge duct through said pick-up tube and said metering orifice so that substantially all liquid fuel is extracted from said polygonal internal chamber through said pick-up tube in each of said plurality of three orientations of said fuel vapor storage canister.

2. The fuel vapor storage canister recited in claim 1 further comprising:

a filter in said pick-up tube between said outboard end thereof and said metering orifice.

3. A fuel vapor storage canister comprising:

a canister body having a carbon bed chamber therein, a liquid trap housing on said canister body having a polygonal internal chamber therein, a vapor inlet port communicating with said polygonal internal chamber, a tubular boss on said canister body in said polygonal internal chamber communicating with said carbon bed chamber having a lip vertically above a gravitational bottom of said polygonal internal chamber, said tubular boss defining a serpentine flow path through said polygonal internal chamber from said vapor inlet port to said carbon bed chamber operative to separate and capture in said polygonal internal chamber up to the level of said lip on said tubular boss liquid fuel entrained with fuel vapor entering said polygonal internal chamber through said vapor inlet port, a vapor purge duct traversing said polygonal internal chamber from said carbon bed chamber to a vapor purge port, a pick-up tube supported on said vapor purge duct with an outboard end juxtaposed said gravitational bottom of said polygonal internal chamber and an inboard end at substantially the center of the flow area of said vapor purge duct and vertically above said lip on said tubular boss relative to said gravitational bottom of said polygonal internal chamber, a metering orifice at said inboard end of said pick-up tube, and a filter in said pick-up tube between said outboard end thereof and said metering orifice.

4. The fuel vapor storage canisters recited in claim 3 further comprising:

a throat in said vapor purge duct having a flow area less than the flow area of said vapor purge duct upstream of and downstream of said throat operative to increase the flow velocity in said vapor purge duct across said inboard end of said pick-up tube.

5. The fuel vapor storage canister recited in claim 4 wherein:

said polygonal internal chamber includes a plurality of three sides which define said gravitational bottom of said polygonal internal chamber in respective ones of a plurality of three orientations of said fuel vapor storage canister and which converge at a corner of said polygonal internal chamber, and said outboard end of said pick-up tube is disposed substantially at said corner of said polygonal internal chamber defined at the convergence of said plurality or three sides thereof so that substantially all of said liquid fuel is extracted from said polygonal internal chamber through said pick-up tube in each of said plurality of three orientations of said fuel vapor storage canister.

6. The fuel vapor storage canister recited in claim 5 further comprising:

a filter in said pick-up tube between said outboard end thereof and said metering orifice.

* * * * *